United States Patent [19]

Belmondo et al.

[11] 4,218,494
[45] Aug. 19, 1980

[54] PROCESS FOR COATING A METALLIC SURFACE WITH A WEAR-RESISTANT MATERIAL

[75] Inventors: Armando Belmondo, Pietraporzio; Massimo Castagna, Turin, both of Italy

[73] Assignee: Centro Richerche Fiat S.p.A., Orbassano, Italy

[21] Appl. No.: 54,056

[22] Filed: Jul. 2, 1979

[30] Foreign Application Priority Data

Jul. 4, 1978 [IT] Italy ................................ 68564 A/78

[51] Int. Cl.² .............................................. C23C 17/00
[52] U.S. Cl. ........................................ 427/35; 427/53;
427/190; 427/191; 427/376.3; 427/376.4;
219/121 EM; 219/121 LM; 29/156.6; 75/203;
75/208 R; 75/222
[58] Field of Search .................... 427/53, 34, 190, 191,
427/192, 229, 247, 35, 376 D, 376 E, 376 H, 383
C, 383 D, 419 F, 377; 219/121 EM, 121 LM;
29/156.5 R, 156.6, 156.63; 75/203, 208 R, 222

[56] References Cited

U.S. PATENT DOCUMENTS

| 2,998,322 | 8/1961 | Strate | 427/190 |
|---|---|---|---|
| 3,097,959 | 7/1963 | Zachman | 427/190 |
| 3,575,433 | 4/1971 | Beyer et al. | 29/156.6 |
| 3,991,229 | 11/1976 | Fengler | 427/53 |
| 4,125,926 | 11/1978 | Gale et al. | 427/53 |

*Primary Examiner*—Ralph S. Kendall
*Attorney, Agent, or Firm*—Sughrue, Rothwell, Mion, Zinn & Macpeak

[57] ABSTRACT

The surface of a metallic substrate is coated with wear-resistant material by depositing on the surface a layer of a mixture of a coating powder including a metallic carbide with powdery silicon and heating said layer by exposure to a source of high density energy to bring about simultaneous evaporation of said silicon and fusion of said coating powder with bonding to said substrate. A coating of high surface porosity can be obtained.

The substrate may be a piston ring for heavy-duty internal combustion engines.

28 Claims, 2 Drawing Figures

PROCESS FOR COATING A METALLIC SURFACE WITH A WEAR-RESISTANT MATERIAL

The present invention relates to a process for coating a metallic surface with a wear-resistant material, with particular reference to the coating of a metallic surface adapted to be located in sliding contact with another, generally metallic, surface in use and which is thus subject to wear. The process of the invention is particularly suitable for the coating of piston rings for internal combustion engines having reciprocating pistons.

It is well known that the evolution of the wear processes generated when moving structural parts come into contact is largely dependent on the mechanical and microstructural properties of the materials involved. In general, wear resistant coatings require:

Perfect bonding between the coating and substratum, with adequate compatibility of their thermomechanical properties (e.g. differential thermal expansion).

Optimum composition of the coupled materials. It is known that, besides hardness, the solubility of one material into the other should be low (say <0.1%) in order to achieve low wear and friction.

Adequate thickness so as to ensure sufficiently long lifetimes without delamination phenomena.

Possibility of lubricant retainment as achievable not only by adequate surface roughness but also by suitable porosity of the coating.

In particular, the coatings of piston rings should guarantee the best possible resistance to wear since on this depends, to a very large extent, both the sealing achieved between the ring and the cylinder, which prevents the escape of the combustion gases, and the reliability of the ring itself.

The present trend in the automobile industry is to design vehicle engines with ever increasing specific power, generally with corresponding increases in the mean pressures within the engine cylinders. This has led to a need to find solutions to the technical problems inherent in the production of piston rings capable of resisting the wear to which their external surfaces are subjected during use.

In the attempt to resolve these technical problems, the general tendency has been to produce rings with porous external surfaces designed to take up lubricating oil, in use, to assist the formation of an interfacial layer of lubricating oil between the ring and the cylinder. The presence of this oil layer has an appreciable, beneficial effect both on the sealing between the ring and the cylinder and on the useful life of the ring.

Wear-resistant coatings obtained by using conventional methods do not seem to satisfy all the necessary requirements. In particular it is difficult to simultaneously obtain a satisfactory surface porosity and satisfactory mechanical and bonding characteristics.

In order to obtain a satisfactory surface porosity, recourse is generally made in the known art to plasma spray methods, in particular in the case of piston rings used in heavy-duty diesel engines. This process consists of spraying molten coating material, such as Cr, Ni and Mo carbides, at very high temperatures (several thousand degrees centigrade) onto the surface to be coated. The minute drops of material projected against the surface reach it in a partially solidified state, that is, in the form of small agglomerates, which become welded together at several points to give rise to a hard, spongy coating which is perfectly designed to ensure the formation of the required interfacial layer of oil between a piston ring and a cylinder, but has the disadvantage of being extremely fragile because of its sponginess.

This fragility is particularly evident in the zone of attachment of the layer to the underlying metallic support with the result that, in the case of two-stroke engines in which there is a strong interaction between the rings and the side openings for the intake and discharge of gases, there is danger of pitting being initiated and leading to rapid breakaway of the coating layer from the underlying support.

On the other hand, the known coating methods based on the use of a high density energy source to bring about a bonding between a substrate and an outer coating layer by fusion generally yield coated materials of satisfactory mechanical and bonding properties, but of very low surface porosity, the outer coating being extremely compact.

An object of the present invention is to provide a process for coating a metallic surface, particularly the external surface of a piston ring, with a wear-resistant material which has a high surface porosity and high mechanical properties and is securely bonded to the underlying support.

Figure 1:
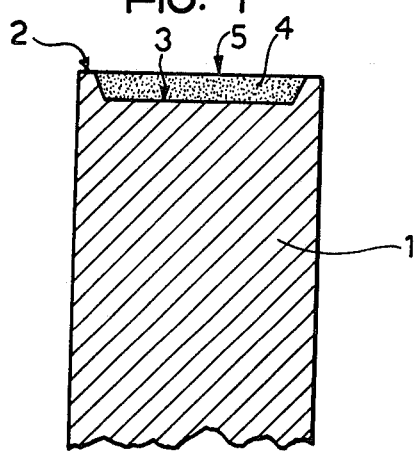
FIG. 1 is a diagramatic sectional showing of a grooved metal substrate filled with a layer of coating material according to the invention.

According to the present invention there is provided a process for coating the surface of a metallic substrate with a wear-resistant material, which comprises depositing on the said surface a uniform layer of an intimate mixture of a coating powder including a metallic carbide with powdery silicon and heating said layer by exposure to a source of high density energy to an extent and for a period sufficient to bring about simultaneous evaporation of said silicon and fusion of said coating powder, and bonding of said layer to said substrate.

Unlike the sponginess which occurs in a coating layer produced by the plasma-spray process, which is due to gaps between the agglomerates which are deposited successively on the surface to be coated, and which thus extends throughout the entire thickness of the layer, the sponginess which is produced by the process of the present invention is substantially superficial, being due to bubbles caused in the coating by the evaporation of the silicon. These gas bubbles tend to be expelled outwardly from the surface during fusion and, if not already open, may easily be opened during the surface finishing of the coating. The zone of contact between the underlying support and the coating formed by the present process is therefore, unlike that of previously known coatings, substantially free from pores and much more strongly bonded to the support, whilst the outer surface has the required porosity for absorbing lubricating oil to ensure the efficient operation of the coated substrate in use.

The coating powder contains a metallic carbide having wear-resistant properties, generally chosen from tungsten and chromium carbides. Chromium carbides are preferably used in the process in the invention. Preferably the melting temperature of the coating powder should be at least 350° C. (typically 350°–650° C.) higher than the boiling temperature of silicon. The coating powder generally contains one or more metals or alloys having wear-resistant properties and a boiling point higher than that of silicon, but lower than that of the carbide, which form a low-melting matrix for the coating. Nickel is preferably used for the purpose, possibly in mixture with metallic chromium. The coating powder may also contain one or more components imparting improved mechanical properties, and especially improved resistance at high temperature to the coating, and having preferably a melting point higher than that of the selected carbide. Metallic molybdenum is preferably used for the purpose.

The carbide may be used in amounts of from 10 to 30% by weight, and preferably of the order of 20% by weight, with respect to the mixture, especially in the case of chromium carbides. The low-melting components may be used in amounts of from 1 to 12% by weight, and preferably about 4-8% by weight with respect to said mixture. The high-melting components such as molybdum may be used in amounts of from 50 to 85% by weight, and preferably of the order of 70% by weight with respect to the mixture. The preferred coating powders consist of chromium carbides, molybdenum and nickel, and may also contain small amounts of metallic chromium (typically 0.5-2 wt.% with respect to the coating mixture), as the commercial chromium carbide powders generally contain small quantities of metallic chromium. The grain size of the coating powder is generally from 10 to 100 microns.

An essential constituents of the coating mixture is silicon. This element is particularly suited for the purposes of the invention, since its latent heat of evaporation is low, whereas its latent heat of fusion is high, ad compared to other elements having similar melting and boiling points. Therefore, the silicon particles probably "explode" under the operative conditions of the process of the invention, with consequent achievement of the desired porosity. The silicon particles should preferably have a size of from 200 to 10 microns, best results being generally obtained with sizes of from 20 to 70 microns. Generally small pores are obtained when using small silicon particles. The amount of silicon to be used depends on the number of pores which it is desired to obtain and the other operative conditions. Generally, the silicon powder is used in amounts of from 4 to 7% by weight with respect to the coating mixture, best results being generally obtained with amounts of the order of 5% by weight.

The source of high density energy may be chosen from those conventionally used in the art of surface treatments (alloying, welding, coating and the like), such as laser beam and electron beam. Typically said souce of energy should be able to provide 100-150 J/mm$^2$ of layer over a period not exceeding 1.5 seconds, and preferably from 0.4 to 1.2 seconds, which corresponds to the energy typically required in the process of the invention. It is generally preferable to use a laser beam for practical reasons, but an electron beam may also be used with advantage when it is desired to carry out the heating under vacuum.

When using a laser beam, it is generally preferable to carry out the heating under an inert atmosphere, for example by flooding the area of impingement of said beam on said layer with an inert gas. Various inert gases may be used for the purpose, such as $CO_2$, argon, nitrogen and helium. The best results are generally obtained when using helium. As an alternative procedure, it may also be possible to apply a thin protective layer on the coating layer prior to the heating treatment.

As previously stated the heating conditions should be such as to obtain an evaporation of the silicon and a fusion of the coating powder, with bonding of the latter to the substrate. In particular the energy supplied should be such as to permit an homogeneous melting of the coating powder and to guarantee a good bonding of the coating to the substrate. On the other hand, the energy supplied should be low enough to keep diffusion of the substrate into the coating below acceptable limits (typically below 30%). The substrate generally is an iron substrate, such as mild or stainless steel, nodular or lamellar cast iron and superalloys. A good balance should also be found between the evaporation rate of silicon powder and the solidification rate of the molten coating. In particular the interaction period should be low enough to obtain the desired formation of micropores inside the coating. Typically the interaction period, or exposure time of each point of the coating layer to the source of energy should not exceed 1.5 seconds, best results being generally obtained with interaction times of from 0.4 to 1.2 seconds. The heating temperature is generally from 2700° to 3000° C. The energy supply is typically from 100 to 150 J/mm$^2$ of coating layer, best results being generally obtained with an energy supply of the order of 120-130 J/mm$^2$.

A practical embodiment of the process of the invention will now be described with reference to the accompanying drawings.

Referring to FIG. 1, a metallic substrate 1, which may be for example a piston ring, is shown. In the outer surface 2 of said substrate is cut a groove 3 substantially of rectangular shape in cross-section, although other specific cross-sectional configurations could be used as desired. The groove 3 occupies a major portion of the surface 2 and has typically a depth of 1-1.5 mm.

The groove 3 is filled with a layer 4 of an intimate mixture of coating powder and silicon powder, the outer surface 5 of the layer 4 being substantially flush with the surface 3. The coating mixture may be directly poured into the groove and compacted to obtain a layer of substantially even surface, using for example a continuous method.

As an alternative, it is also possible to add to the coating mixture a suitable liquid binder or anchoring agent to form a paste which is then spread over the surface to cover the groove. The addition of a binder may be necessary in some cases to provide a strong hold to the substrate both before and during the treatment, for example when the substrate has a cylindrical outer surface and when it is desired to expose the coating layer formed at a preceding step to a fixed source of energy by controlled rotation of the substrate.

The binder may be chosen from a large number of products, such as oils, hydrocarbons or the products commercialized by the WALL COLMONOY LMT. COMPANY under the Trade Names Nicrobraz and Nicrocoat, best results being generally obtained with these last products.

Figure 2:
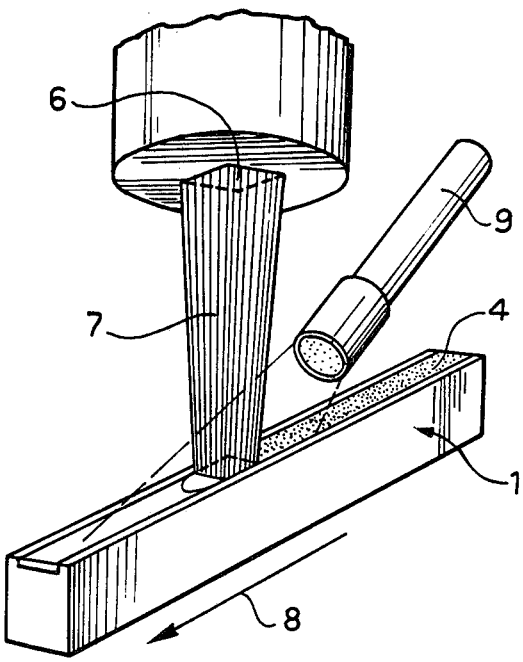
FIG. 2 is a diagramatic showing illustrating a method of heating according to the invention.

The coating layer 4 is heated by using a laser 6 as schematically indicated in FIG. 2. The laser beam 7 is impinged on the layer 4 to fuse the coating powder. The laser beam is focused to the desired spot size, so that the beam impinges only on the powder in the groove. The substrate 1 is displaced in the direction indicated by the arrow 8 at a speed such as to obtain the desired interaction time, or time of impingement of the beam 7 on each portion of the layer 4. As shown in FIG. 2, a shielding gas nozzle 9 is arranged typically at 2-4 cm from the fusion zone and at an angle of 30°–50° to the surface of the substrate to provide an inert gas jet to mantle the fusion area.

The substrate thus treated can be brought to the desired shape by conventional trimming operations. By using the process of the invention, it is possible to obtain coatings with an excellent bonding to the metallic substrate and with the desired surface porosity. The process of the invention is particularly suited for the production of coated mechanical parts operating under severe conditions (high temperatures, insufficient lubrication), such as piston rings for heavy-duty Diesel engines. Coating thicknesses up to 1–1.5 mm and of excellent characteristics may be obtained by means of the process of the invention.

The process of the invention will now be illustrated by the following non-limitative example.

EXAMPLE

The energy source was a continuous-wave laser system with a lasing mixture consisting essentially of $CO_2$ with small amounts of other gases such as $H_2$, $H_e$ and CO. Maximum continuous power of this source is 15 KW which can be reached in a minimum rise time of 250 msec. The wave length is within the infrared spectrum ($\lambda = 10.6$ $\mu$m).

Optical radiation pumping, that is the population inversion of energy levels needed to get the laser effect, is provided by an electron beam which energizes the laser mixture crosswise to the gas flow. The system has two work stations, the first one being equipped with an optical system for providing high concentrations of energy ($1.5 \times 10^6$ W/cm$^2$) and the second one being use for surface treatments. The optical system consists of two high-frequency vibrating mirrors for oscillating the laser beam in two perpendicular directions to give a rectangular beam of variable size from $6 \times 6$ mm to $25 \times 25$ mm.

A series of tests was carried out by using as a coating powder a mixture of commercial powders known under the Trade Names 63 NS and 81 NS of the METCO Inc. Company. The 63 NS powder consists of Molybdenum and the 81 NS powder has the following composition by weight: 20% Ni, 5% Cr and 75% $Cr_3C_2$ and $CR_5C_2$. The two powders were mixed with a silicon powder having a grain size not exceeding 66 $\mu$m, in such amounts as to obtain a coating mixture of the following composition by weight: 70% molybdenum, 18.8% carbides, 5% Ni, 1.2% Cr and 5% Si. The coating mixture was mixed with a binder, generally Nicrocoat to obtain a pasty mass having good adherence to the substrate.

The samples to be coated were cast iron bars of parallelepipedic form with an upper surface of $100 \times 10$ mm and a heigth of 15 mm. A groove having a depth of 1.5 mm and about 8 mm large was formed on the upper surface, and the pasty mass was spread in the groove to fill the latter.

The test bars were heated using the embodiment shown in FIG. 2 and an $8 \times 8$ mm laser beam. 12 KW was the highest power level the laser was operated. During the tests the fusion area was mantled with a helium jet, using a nozzle located at about 25–35 mm from the fusion zone at an angle of 35° to the surface of the samples and a flow rate of 3500 l/hr.

Optimization of the operative parameters was first carried out by varying the sample displacement speed and the power level, good results being obtained with a sample displacement velocity of from about 40 to about 90 cm/min and with nominal laser powders of from 8 to 12 KW, which corresponds to a specific energy of 100–150 J/mm$^2$ which is both sufficient to obtain good bonding and porosity and homogeneous melting and lower enough to prevent excessive diffusion of iron (>30%) into the coating.

A series of runs was then carried out using an energy of 125 J/mm and an interaction time of about 0.8 sec (displacement speed of 60 cm/min).

The test bars thus coated were submitted to structural analysis, which showed the excellent bonding of the coating to the substrate. The structure consists of molybdenum dendrites surrounded by a chromium-nickel matrix containing chromium carbides. The coating generally proved to be perfectly homogeneous for thicknesses up to 1 mm. The major elements are uniformly distributed throughout the thickness of the coating with a gradual reduction in concentration towards the coating-substrate interface. A noticeable iron content (10–30%) was found in the samples examined, which is mainly due to boiling process of the substrate at the operating temperature (2800° C.).

Microhardness tests showed an excellent hardness distribution throughout the thickness of the coating, with an average value of 800–900 HV.

The samples have a uniformly distributed porosity with a maximum pore size of about 80 $\mu$m.

To ascertain the medium- and high-temperature structural stability of the coating, a number of samples were heated to 300°, 500°, 750° and 850° C. for 5 hours and then air cooled. X-ray diffraction showed a gradual transformation from $\gamma$ to $\alpha$ type structures. Transformation begins at about 400° C. and reaches 100% at 750° C. This causes a further increase in hardness to about 1000 HV. No noticeable change in structure was observed on samples heated at temperatures below 400° C. for up to 200 hours.

Wear tests were carried out in the laboratory on a reciprocating motion testing equipment. A series of slides coated according to the conventional plasmay-spray method and respectively the procedure described above, with a coating powder of the same composition, were tested against stationary samples of lamellar cast iron with a controlled surface roughness. The tests were performed under different normal loads at a relative speed of 1.25 m/sec for a total of 27 Km in conditions of insufficient lubrication, using paraffin oil. A surface roughness of 1.2 Ra was used.

The results show the behaviour of the laser coating to be far superior especially for specific normal loads in excess of 800–1000 N/cm$^2$. Thus, the wear under a load of about 2400N/cm$^2$ was about 4 mg by using the plasma-spray method and only about 1 mg by using the coating method of the invention. Moreover, micrographs relative to the bonding region of the sliders thus tested show the formation of a crack at the interface in the case of the plasma-spray coating, which seriously impairs the bonding of the coating to the base metal.

We claim:
1. A process for coating the surface of a metallic substrate with a wear-resistant material, which comprises depositing on the said surface a uniform layer of an intimate mixture of a coating powder including a metallic carbide with powdery silicon and heating said layer by exposure to a source of high density energy to an extent and for a period sufficient to bring about simultaneously evaporation of said silicon and fusion of said coating powder, and bonding of said layer to said substrate.

2. The process of claim 1, wherein said carbide is selected from the group consisting of tungsten and chromium carbides.

3. The process of claim 1, wherein said carbide is chromium carbide.

4. The process of claim 1, wherein said coating powder contains one or more wear-resistant metals or alloys having a boiling point higher than that of silicon but lower than that of the carbide, to from a low-melting matrix for the coating.

5. The process of claim 4, wherein said matrix is selected from the group consisting of nickel and mixtures thereof with chromium.

6. The process of claim 4, wherein said matrix is used in amounts of from 1 to 12% by weight with respect to the said intimate mixture.

7. The process of claim 1, wherein said coating powder contains one or more component having a melting point higher than that if the carbide to confer improved temperature-resistance on the coating.

8. The process of claim 7, wherein said component is metallic molybdenum.

9. The process of claim 7, wherein said component is used in amounts of from 50 to 85% by weight with respect to the said intimate mixture.

10. The process of claim 1, wherein said carbide is used in amounts of from 10 to 30% by weight with respect to said intimate mixture.

11. The process of claim 1, wherein said silicon is used in amounts of from 4 to 7% by weight with respect to said intimate mixture.

12. The process of claim 1, wherein said powdery silicon has a grain size of from 10 to 200 microns.

13. The process of claim 1, wherein said powdery silicon has a grain size of from 20 to 70 microns.

14. The process of claim 1, wherein said intimate mixture contains about 20 wt.% of chromium carbides, about 70 wt.% of molybdenum and about 5 wt.% of silicon, the remainder consisting essentially of nickel and chromium.

15. The process of claim 1, wherein said source of energy is chosen from those able to provide 100–150 $J/mm^2$ of layer over a period not exceeding 1.5 seconds.

16. The process of claim 1, wherein said source of energy is chosen from electron beam and laser beam.

17. The process of claim 1, wherein said source of energy is a laser beam.

18. The process of claim 17, wherein the area of impingement of said beam on said layer is mantled with an inert gas during said heating.

19. The process of claim 18, wherein said inert gas is selected from the group consisting of $CO_2$, argon, helium and nitrogen.

20. The process of claim 18, wherein said inert gas is helium.

21. The process of claim 1, wherein the exposure time of each point of the layer to the source of energy does not exceed 1.5 seconds.

22. The process of claim 21, wherein said exposure time is fom 0.4 to 1.2 seconds.

23. The process of claim 1, wherein the supply of high density energy is from 100 to 150 $J/mm^2$.

24. The process of claim 23, wherein said energy supply is from 120 to 130 $J/mm^2$.

25. The process of claim 1, wherein the heating temperature is from 2700° to 3000° C.

26. The process of claim 1, wherein said intimate mixture is applied on the surface of the substrate upon admixture with a liquid binder or anchoring agent.

27. The process of claim 1, wherein said substrate is an iron-based substrate.

28. The process of claim 1, wherein said substrate is a piston ring.

* * * * *